Sept. 20, 1966  JAMES E. WEBB  3,273,388
ADMINISTRATOR OF THE NATIONAL AERONAUTICS
AND SPACE ADMINISTRATION
APPARATUS FOR MEASURING ELECTRIC FIELD STRENGTH
ON THE SURFACE OF A MODEL VEHICLE
Filed March 5, 1964                                              3 Sheets-Sheet 1

JOHN M. SELLEN, JR
DAVID F. HALL
INVENTORS

BY
ATTORNEYS

Sept. 20, 1966   JAMES E. WEBB   3,273,388
ADMINISTRATOR OF THE NATIONAL AERONAUTICS
AND SPACE ADMINISTRATION
APPARATUS FOR MEASURING ELECTRIC FIELD STRENGTH
ON THE SURFACE OF A MODEL VEHICLE
Filed March 5, 1964                                     3 Sheets-Sheet 3
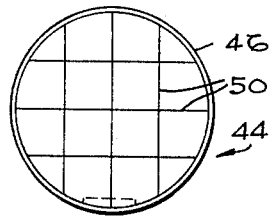
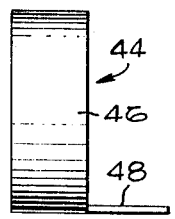
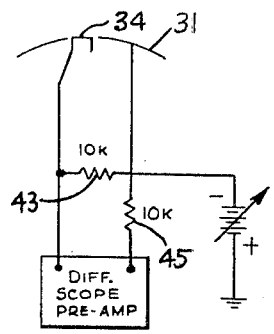
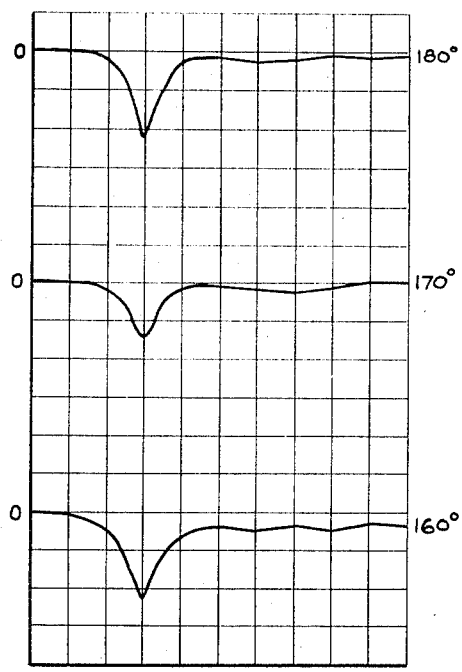
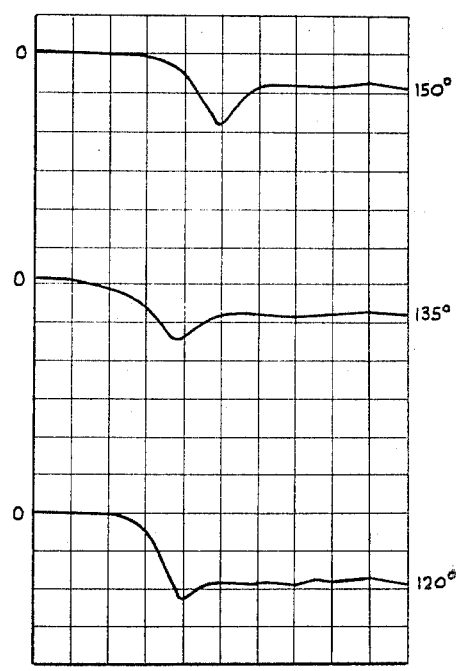
JOHN M. SELLEN, JR.
DAVID F. HALL
   INVENTORS
BY
   ATTORNEYS United States Patent Office
3,273,388
Patented Sept. 20, 1966

3,273,388
APPARATUS FOR MEASURING ELECTRIC FIELD STRENGTH ON THE SURFACE OF A MODEL VEHICLE
James E. Webb, Administrator of the National Aeronautics and Space Administration, with respect to an invention of John M. Sellen, Jr. and David F. Hall
Filed Mar. 5, 1964, Ser. No. 349,782
8 Claims. (Cl. 73—147)

The invention relates to an apparatus for simulating travel of a space vehicle through a space environment of dilute plasma. This plasma is a fluid composed of ions and electrons in densities less than approximately $10^6$ electron/cc. More particularly the present invention is an apparatus which provides a method of determining the effect the resident plasma in space has on the electric field surrounding a rapidly moving space vehicle propelled by an electrical propulsion device.

Electrical propulsion specialists need a means for monitoring the potential of a space vehicle since this potential reflects the operation and efficiency of the ion engine. The vehicle potential will also affect certain experiments which may be on board, and will affect the electrical drag encountered by the vehicle. This monitoring can be achieved with a knowledge of the electric field strength at the vehicle surface and of the shape of the electric field which surrounds the vehicle in an area termed a sheath.

This sheath is a region of disturbed plasma created by the electrical interaction between the plasma and a space vehicle traveling therethrough. Therefore, in the interest of developing devices to monitor the potential of a space vehicle it is desirable to simulate the condition of a space vehicle moving rapidly through space to determine the interactions between the resident plasma and the vehicle. There are instruments and methods available for examining the sheath surrounding a model vehicle immersed in a stream of plasma. However, these instruments and methods will not be discussed herein since the present invention is concerned only with determining how the electric field strength on the surface of a vehicle is effected by encountering a plasma environment.

This is accomplished by the present invention which includes, briefly, a "plasma" wind tunnel having a model space vehicle disposed therein. The "plasma" wind tunnel has a plasma source disposed in one end thereof that can be pulsed on and off to form a pulsed plasma beam which is directed at the model vehicle. The model space vehicle is provided with a sensor means that yields information as to current flow induced in the sensor during the period when the model vehicle is being engulfed by the stream of plasma. This information makes possible a valid calculation of the enhancement of the electric field strength on the surface of the model vehicle.

The electrical interaction between the space vehicle and plasma can be easily calculated when the vehicle velocity relative to a stationary earth is less than the velocity of the ions in the plasma relative to earth. However, when the relative velocity of the space vehicle is greater than that of the plasma ions, as is usually the case for an orbiting space vehicle, a conventional calculation of the plasma-vehicle interaction becomes extremely complicated and it becomes necessary to experimentally determine the plasma-vehicle interaction.

It is thetrefore a principal object of this invention to provide an apparatus for simulating the condition of a space vehicle moving rapidly through the resident plasma of space.

An additional object of the present invention is to provide an apparatus and method of examining the electrical interaction between a space vehicle and its environment.

A yet further object is to provide an apparatus and method for determining the enhancement of the electric field strength on the surface of a vehicle when the vehicle encounters a plasma space environment.

Other objects and advantages of the invention will become more apparent by considering the following detailed description in conjunction with the attached drawings, wherein:

FIG. 4 illustrates the circuit and instrument employed to measure the current flow induced in the sensor button;

FIG. 5 is graphical representation of the effect angular displacement of the sensor button has on the induced current flow; and FIGS. 6a and 6b are enlarged views of another embodiment of the sensor button.

Figure 1:
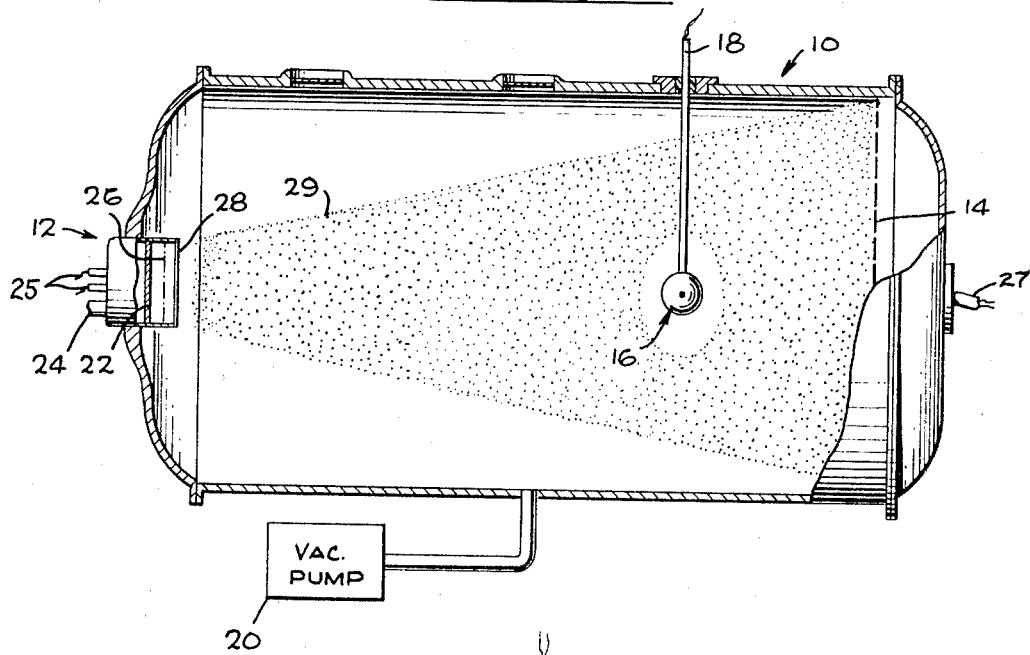
FIG. 1 is a side view, partially in cross section, of the apparatus employed to simulate travel of a space vehicle through space.

Referring now to the drawings herein like numerals designate like elements in each of the several figures. The situation of a vehicle traveling through a plasma at a considerable speed is simulated in the laboratory with the apparatus illustrated in FIG. 1. The apparatus consists of a cylindrical vacuum tank 10 having a plasma source 12 mounted in one end thereof and a collector 14 mounted in the other end. A spherical model space vehicle 16 is supported within the vacuum tank by tube 18. All openings into the interior of the vacuum tank for mounting the various components of the apparatus are suitably sealed to permit evacuation of the vacuum tank by vacuum pump 20.

The plasma source includes an ion emitter 22, a conduit 24 through which a suitable propellant such as cesium vapor is pumped, an accelerator grid 26 and a neutralizer 28. The ion emitter is a porous tungsten plug which is heated during operation thereof to facilitate the ionization process and prevent the accumulation of cesium oxide on the plug. When the cesium vapor passes through the heated tungsten plug the cesium atoms lose an electron to form positive ions. An ion cloud is formed in the area in front of the tungsten plug and these ions are accelerated toward the model space vehicle when the porous tungsten plug is biased positively and accelerator grid 26 is given a negative bias. Neutralizer 28, mounted in front of the ion emitter and accelerator grid, is an electron emitting wire which injects electrons into the accelerated ions to form a plasma beam. It is desirable that the plasma beam be pulsed on and off and this is accomplished by pulsing the positive bias on the porous tungsten plug. The collector 14, a series of electrically isolated rings, collects the ions and electrons of the plasma beam to prevent an area of electrical disturbance being formed within the plasma stream and also yields information as to the extent and uniformity of the beam. The power supplies (not shown) for operating the components of the plasma source and the collector are positioned adjacent the vacuum tank and are connected thereto by means of electrical connections 25 and 27 at each end of the tank.

Figure 2:
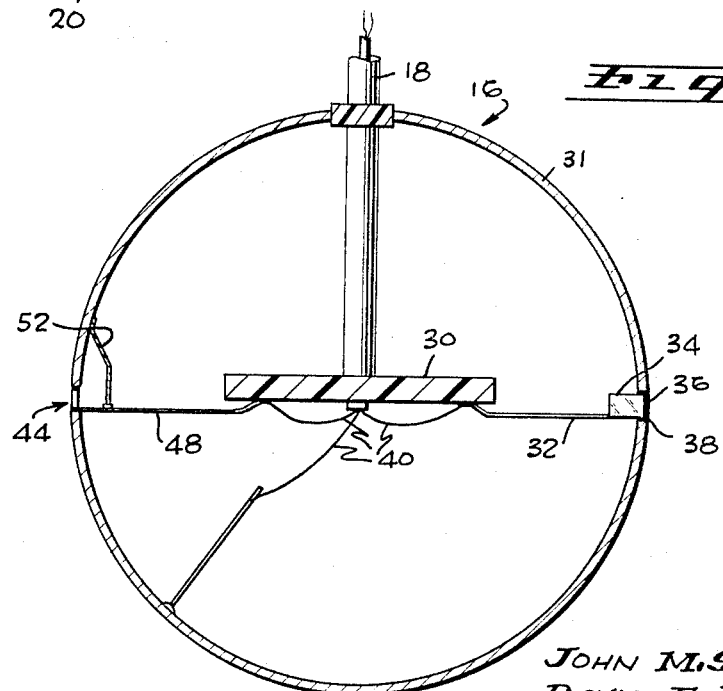
FIG. 2 is an enlarged cross sectional view of the model space vehicle illustrating the details of how the sensor buttons are mounted.

Referring now to FIG. 2 where an enlarged cross section of the model space vehicle is illustrated. The model space vehicle includes a hollow sphere 31 which is attached to and supported by tube 18. A supporting block 30 of ceramic or other insulating material attached to one end of tube 18 is centrally disposed within sphere 31. A charge sensing button 34, made of tungsten, is mounted on a support arm 32 fixed to block 30 such that outer surface 36 of the sensor is flush with the outer surface of the spherical vehicle. Several of the sensor buttons can be arranged around the periphery of the spherical vehicle and each of the buttons are insulated with respect to the sphere, as at 38, so that the operation of each individual sensor may be examined. The sensor buttons are electrically connected by electrical leads 40 which pass through tube 18 to electrical monitoring instruments outside the vacuum tank for measuring the current induced in each sensor.

Figure 3:
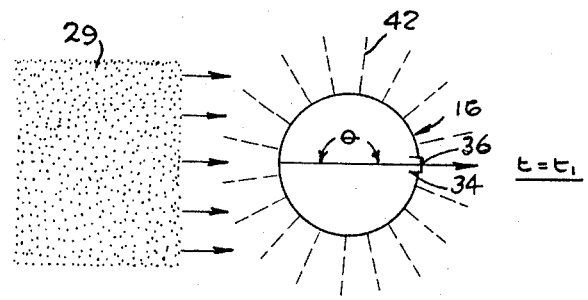
FIGS. 3a–3d illustrate the relationships between induced current flow in the sensor button and the impingement of the plasma beam on the model vehicle.
Figure 3:
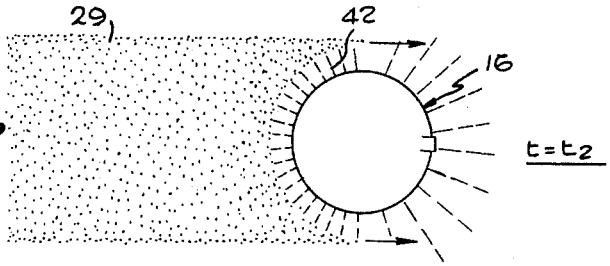
Figure 3:
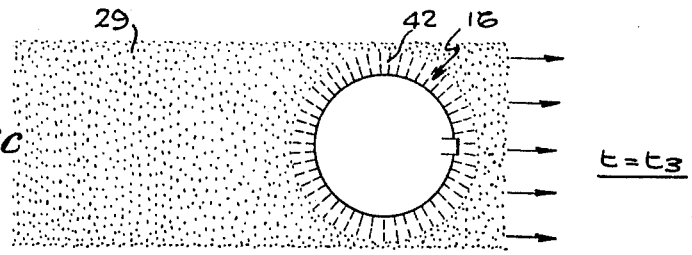
Figure 3D:
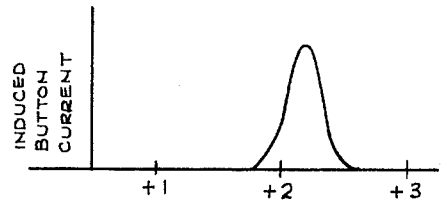

The theory of how the plasma enhancement of electric field strength on the outer surface of the vehicle is calculated will now be discussed. This discussion is limited to situations wherein the space vehicle is maintained at a predetermined negative potential. A negative potential was chosen since the potential of a space vehicle with a faulty neutralizer on its ion engine will be negative. The relationships between the vehicle being engulfed by the plasma stream and current flow being induced in the sensor is illustrated in FIG. 3. In FIG. 3a the plasma source has been pulsed on, but plasma beam 29 at a time $t_1$ has not yet reached the model vehicle so the sphere is essentially isolated in a vacuum. The dotted lines 42 are used to illustrate the extent of the lines of force in the electric field surrounding the vehicle. The electric field and thus the lines of force would terminate at infinity when the sphere is located in a vacuum. FIGS. 3b and 3c illustrate the progress of the plasma beam in engulfing the vehicle at times $t_2$ and $t_3$. The presence of the plasma produces a circumstance wherein the electric field no longer extends to infinity, but instead terminates near the vehicle as illustrated by the shortened dotted lines 42. FIG. 3d illustrates the time sequence of the current flow induced in the sensor. It should be noted that current flow begins at $t_2$, reaches a peak between times $t_2$ and $t_3$ and returns to zero by time $t_3$ when the vehicle is completely engulfed in the plasma. The induced current which flows on the sensor button can be observed and measured with a differential scope and preamplifier connected in a circuit like that shown in FIG. 4. The induced current is measured by the potential drop across the resistor 43 between the sphere and the sensor. The other resistor 45 aids in the D.C. balance of the preamplifier.

The electric field strength on the surface of the model at time $t_1$, when vacuum conditions prevail, is given by:

$$E_v = \frac{V_s}{r_s}$$

where $V_s$ is the sphere potential relative to plasma potential in volts and $r_s$ is the radius of the vehicle in inches, where the subscript "$v$" refers to a vacuum, and subscript "$s$" refers to the sensor. The electric field strength on the surface of the model vehicle at time $t_3$ when the vehicle is engulfed in the plasma is given by:

$$E_p = \alpha \frac{V_s}{r_s}$$

where $\alpha$ is the electric field enhancement, and where the subscript "$p$" refers to a plasma. The total charge on the surface of the sensor under vacuum conditions, $Q_{sv} = \epsilon_0 E_v A_s$, where $\epsilon_0$ is the permittivity of free space, $8.8 \times 10^{-12}$ farads/meter and $A_s$ is the area of surface 36 of sensor 34. After the plasma beam has enveloped the model vehicle the total charge, $Q_{sp}$ is given by:

$$Q_{sp} = \epsilon_0 E_p A_s$$

By combining the three above expressions the electric field strength in the plasma may be expressed in terms of the electric field strength in a vacuum and the change in charge, $\Delta Q$, which is measurable.

$$E_p = \frac{Q_{sp}}{\epsilon_0 A_s} = \frac{Q_{sv} + \Delta Q}{\epsilon_0 A_s} = E_v + \frac{\Delta Q}{\epsilon_0 A_s}$$

$Q_{sp}$ is the charge in a vacuum, $Q_{sv}$, plus the additional $\Delta Q$ resulting from the engulfing of the vehicle by the plasma beam. This leads to a convenient expression for the electric field enhancement $\alpha$:

$$\alpha = \frac{E_p}{E_v} = 1 + \frac{r_s}{\epsilon_0 A_s} \cdot \frac{\Delta Q}{V_s}$$

The amount of change in charge, $\Delta Q$, is obtained by integrating the current flow $i_b$ induced in the sensor over the interval of time, $\Delta t$, the current flows. This was accomplished by photographing the waveform of the induced current flow display on the scope with a camera and then performing the integration with a planimeter.

The sensor button as illustrated in FIG. 3 is positioned within the vehicle such that surface 36 of the sensor button is facing in the direction of flow of the plasma beam. Reference is now made to FIG. 5 where the effect of rotating the model vehicle counterclockwise in 10° increments is graphically illustrated. Counterclockwise rotation of the vehicle changes the angular direction in which the sensor faces from an angle $\theta$ of 180° (see FIG. 3a) to a lesser angle. Note that at an angle $\theta$ of 180° the only current measured is induced current which reaches a peak and then returns to zero. As the vehicle is rotated counterclockwise to reduce the angle $\theta$ to less than 180° it will be noted that, at an angle $\theta$ of 150° and less, the current flowing does not return to zero. This is due to the fact that the current being measured now consists of both induced current and current caused by collection of positive ions from the plasma. Inasmuch as it is desired to measure the induced current rather than the current due to the collection of ions on sensor surface 36, it was necessary to provide a modified embodiment of the sensor button for use when the sensor was oriented such that a solid button sensor would not work.

A modified sensor 44 is illustrated in FIGS. 6a and 6b. This sensor is composed of a ring member 46 mounted in surface 31 of the model vehicle (see FIG. 2) by a support arm 48 attached to block 30. Ring member 46 has six wires 50 attached to the outer end thereof and these wires form the effective electrical area to which the induced currents will flow. This effective electrical area is virtually the same as the solid button. However, the physical area presented by the wires is greatly reduced from that presented by the solid tungsten button. Therefore, the vast majority of the charge carriers, positive ions, which would contact a solid sensor button will miss the small surface area presented by the wires. Thus, the current flow due to the collection of positive ions will be negligible and an effective measurement of the induced current flow can be made. A collecting electrode 52, electrically connected to sphere surface 28, but not to support arm 48, is provided for trapping the positive ions which pass through sensor 44 to prevent them from passing into the interior of the sphere.

This completes the description of the one preferred exemplary embodiment of the invention, however there will be many changes and modifications thereto which may be made by one skilled in the art to which this invention pertains without departing from the spirit and scope of the invention as defined in the appended claims.

What is claimed is:
1. An apparatus for simulating the condition of a space vehicle moving rapidly through space and determining the electrical interaction between the space vehicle and the resident plasma in space; said apparatus comprising:
   (a) a cylindrical vacuum chamber,
   (b) a plasma source mounted in one end of said vacuum chamber for directing a pulsed plasma beam toward the other end of said vacuum chamber,
   (c) a model space vehicle positioned within said vacuum chamber in the path of the pulsed plasma beam,
   (d) means supporting said model vehicle within said vacuum chamber,

(e) sensor means mounted in said model vehicle, and
(f) means for measuring the momentary flow of electrical current induced in the sensor means during the interval of time when each of the plasma pulses from the plasma source is engulfing the model vehicle.

2. The apparatus recited in claim 1 wherein said sensor means includes:
(a) a cylindrical tungsten button having an end surface which is flush with the outer surface of said model vehicle and functions as the sensing area of said sensor means.

3. The apparatus recited in claim 1 wherein said sensor means includes:
(a) a ring member having a plurality of conductor wires attached across one end thereof,
(b) said one end of said ring member and the conductor wires being substantially flush with the outer surface of said model vehicle whereby said conductor wires function as the sensing area of said sensor means.

4. An apparatus for simulating the condition of a space vehicle moving rapidly through space and determining the electrical interaction between the space vehicle and the resident plasma in space, said apparatus comprising:
(a) a cylindrical vacuum chamber,
(b) a plasma source mounted in one end of said vacuum chamber for directing a pulsed beam at the other end of said vacuum chamber,
(c) a model space vehicle positioned within said vacuum chamber in the path of the pulsed plasma beam,
(d) means supporting said model vehicle within said vacuum chamber,
(e) a tungsten sensor button mounted in said model vehicle,
(f) said sensor button being substantially cylindrical and mounted such that one end surface thereof is flush with the outer surface of said model vehicle,
(g) means insulating said sensor button from said model vehicle, and
(h) means for measuring the momentary flow of electrical current induced in the sensor means during the interval of time when the plasma pulses from the plasma source engulf the model vehicle.

5. An apparatus for simulating the condition of a space vehicle moving rapidly through space and determining the electrical interaction between the space vehicle and the resident plasma in space, said apparatus comprising:
(a) a cylindrical vacuum chamber,
(b) a plasma source mounted in one end of said vacuum chamber for directing a pulsed plasma beam at the other end of said vacuum chamber,
(c) a spherical model space vehicle positioned within said vacuum chamber in the path of the pulsed plasma beam,
(d) means supporting said model vehicle within said vacuum chamber,
(e) a plurality of charge sensing devices mounted in said model vehicle at the periphery thereof,
(f) means insulating said charge sensing devices from said model vehicle, and
(g) means for measuring the flow of electrical current induced in each of said charge sensing devices when the plasma beam engulfs the model vehicle.

6. The apparatus recited in claim 5 wherein said plurality of charge sensing devices includes a first sensing device comprising:
(a) a cylindrical tungsten button having a solid end surface which functions as the charge sensing area thereof,
(b) said cylindrical button being mounted in said model vehicle such that the solid end surface is flush with the outer surface of said model vehicle, and
(c) a second device comprising a ring member having a plurality of conductor wires attached across one end thereof which function as the charge sensing area thereof,
(d) said ring member being mounted in said model vehicle such that one end of said ring and the plurality of conductor wires are substantially flush with the outer surface of said model vehicle.

7. A method of obtaining information for determining the enhancement of the electric field strength on the surface of a model vehicle moving rapidly through the resident plasma environment of space, said method comprising the steps of:
(a) directing a pulsed plasma beam at a model vehicle having a charge sensing device disposed therein, and
(b) measuring the magnitude of induced current which flows on the charge sensing device when the model vehicle is engulfed by the plasma pulses from the pulsed plasma beam.

8. The method recited in claim 7 which further includes the step of:
(a) summing the measured current magnitude over the interval of time the current flows.

References Cited by the Examiner
UNITED STATES PATENTS
3,121,329  2/1964  Bennett _____ 73—147

DAVID SCHONBERG, *Primary Examiner.*